United States Patent Office 3,058,927
Patented Oct. 16, 1962

3,058,927
SELF-EXTINGUISHING THERMOPLASTIC ALKENYL AROMATIC POLYMER COMPOSITION CONTAINING AMMONIUM BROMIDE, AN ANTI-CORROSION AGENT, AND A DI(ARALKYL) PEROXIDE AND METHOD OF PREPARING SAME
Elmer L. McMaster, Jacob Eichhorn, and Floyd B. Nagle, Midland, Mich., assignors to The Dow Chemical Company, Midland, Mich., a corporation of Delaware
No Drawing. Filed July 13, 1959, Ser. No. 826,390
10 Claims. (Cl. 260—2.5)

This invention concerns self-extinguishing aromatic polymer compositions and pertains to a method of making the same. It relates more particularly to compositions of alkenyl aromatic polymers and ammonium bromide in combination with certain agents which act as synergists to enhance the flame-proofing action of the ammonium bromide and render the polymers self-extinguishing.

It is known to incorporate ammonium bromide with flammable organic materials such as cellulose films, nitrocellulose or to render them flame-proof, or to employ ammonium bromide, together with an ammonium salt such as ammonium phosphate, to prevent the flaming of inflammable articles such as fabrics, paper, wood or the like.

It has now been discovered that easily inflammable organic polymers, particularly alkenyl aromatic polymers such as the homopolymers and copolymers of one or more monovinyl aromatic comopunds, can readily be rendered non-flammable or self-extinguishing by intimately incorporating with the polymer a small but effective proportion of finely divided ammonium bromide and an organic peroxide, e.g. dicumyl peroxide. It has further been found that the organic peroxide has a synergistic action for enhancing the flame-proofing characteristics of the ammonium bromide, and permits the employment of said ammonium bromide in proportions substantially smaller than is required alone to render a given alkenyl aromatic polymer flame-proof.

The term "flame-proof" or "self-extinguishing" employed herein means incapable of sustaining a flame for more than 15 seconds after heating a test piece of the composition until ignited in an open flame and then removing the flame.

The alkenyl aromatic polymers to be employed in the process can be any of the flammable, normally solid thermoplastic homopolymers and copolymers of one or more monovinyl aromatic compounds having the general formula: Ar—CH=CH₂, wherein Ar represents an aromatic radical of the group consisting of aromatic hydrocarbon and nuclear halogenated aromatic hydrocarbon radicals of the benzene series or copolymers of at least 70 percent by weight of at least one of such monovinyl aromatic compounds and not more than 30 percent by weight of another monomer such as acrylonitrile, methyl methacrylate or alpha-methylstyrene, copolymers of from 90 to 99 percent by weight of one or more of such monovinyl aromatic compounds and from 10 to 1 percent by weight of natural or a synthetic rubber such as rubbery copolymers of acrylonitrile and butadiene, rubbery copolymers of styrene and butadiene, rubbery copolymers of styrene, methyl isopropenyl ketone and butadiene, or polymeric compositions consisting of mechanical blends of homopolymers or coplymers of such vinyl aromatic compounds and from 1 to 10 percent by weight of natural or a synthetic rubber.

The organic peroxides to be employed as synergists in combination with the finely divided ammonium bromide for enhancing its flame-proofing properties can be any relatively non-volatile organic peroxy compound boiling at 100° C. or above at 760 millimeters absolute pressure, and having a half-life of at least 2, preferably from 5 to 15, hours or longer as determined in benzene at 100° C., which organic peroxygen compound contains at least 6 carbon atoms in the molecule and has at least one tertiary carbon atom attached to an oxygen atom of the peroxy group. The organic peroxides are preferably di(aralkyl)-peroxides having the general formula:

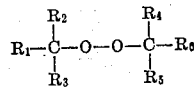

wherein $R_1$ and $R_6$ is an aromatic hydrocarbon radical of the benzene series and $R_2$, $R_3$, $R_4$ and $R_5$ is selected from the group consisting of alkyl radicals containing from 1 to 3 carbon atoms and aromatic hydrocarbon radicals of the benzene series. Examples of suitable di(aralkyl)peroxides are dicumyl peroxide,
bis($\alpha$-methyl-$\alpha$-ethylbenzyl)peroxide,
bis($\alpha,\alpha$-diethylbenzyl)peroxide,
bis($\alpha,\alpha$-diisopropylbenzyl)peroxide,
bis($\alpha,\alpha$-dipropylbenzyl)peroxide,
bis($\alpha,\alpha$-dimethyl-p-methylbenzyl)peroxide,
bis($\alpha$-methyl-$\alpha$-ethyl-p-methylbenzyl)peroxide,
bis($\alpha,\alpha$-diethyl-p-methylbenzyl)peroxide,
bis($\alpha,\alpha$-dimethyl-p-ethylbenzyl)peroxide,
bis($\alpha,\alpha$-diisopropyl-p-methylbenzyl)peroxide,
bis($\alpha$-methyl-$\alpha$-ethyl-p-ethylbenzyl)peroxide,
bis($\alpha,\alpha$-diethyl-p-ethylbenzyl)peroxide,
bis($\alpha,\alpha$-diisopropyl-p-ethylbenzyl)peroxide,
bis($\alpha,\alpha$-dimethyl-p-isopropylbenzyl)peroxide,
bis($\alpha$-methyl-$\alpha$-ethyl-p-isopropylbenzyl)peroxide,
bis($\alpha,\alpha$-diethyl-p-isopropylbenzyl)peroxide,
bis($\alpha,\alpha$-diisopropyl-p-isopropylbenzyl)peroxide,
bis($\alpha,\alpha$-dimethyl-p-tert.-butylbenzyl)peroxide,
bis($\alpha$-methyl-$\alpha$-ethyl-p-tert.-butylbenzyl)peroxide,
bis($\alpha,\alpha$-diethyl-p-tert.-butylbenzyl)peroxide,
bis($\alpha,\alpha$-diisopropyl-p-tert.-butylbenzyl)peroxide,
bis($\alpha,\alpha$-dimethyl-p-pentamethylethylbenzyl)peroxide,
bis($\alpha$-methyl-$\alpha$-ethyl-p-pentamethylethylbenzyl)peroxide,
bis($\alpha,\alpha$-diethyl-p-pentamethylethylbenzyl)peroxide, and
bis($\alpha,\alpha$-diisopropyl-p-pentamethylethylbenzyl)peroxide.

The ammonium bromide to be employed as the flame-proofing agent in admixture with the organic peroxide synergist for the same is required to be in finely divided or powdered form preferably of particles of sizes of 200 mesh per inch or smaller as determined by U.S. standard screens. The ammonium bromide is employed in admixture with anti-corrosion or stabilizing agents which have an action for neutralizing or inhibiting the formation of HBr by decomposition of the ammonium bromide. Suitable inhibitors or stabilizing agents are tris-(nonylphenyl)phosphate, the diethylamine salts of a 50–50 weight percent mixture of the mono- and di(octylphenyl)esters of phosphoric acid, inner salts of the N-alkyl ($C_{12}$ to $C_{16}$) beta-aminobutyric acid and di-(sec.-butyl)phenyl monoethers of polyethylene glycols having an average molecular weight of about 2000.

The ammonium bromide, and the stabilizing agent therefor are usually incorporated with one another in finely divided form by mixing an aqueous solution of the ammonium bromide with an aqueous emulsion of the stabilizing agent and spray drying the resulting mixture. The solids are recovered as free-flowing finely divided particles intimately mixed with one another. Advantageously, a latex of an alkenyl aromatic polymer, e.g. polystyrene prepared by polymerizing monomeric styrene in aqueous emulsion, can be mixed with the dispersion of the solution of the ammonium bromide and the stabilizing agent and the resulting mixture spray dried to obtain a free-flowing finely particulate product. Such product has less tendency to agglomerate and is more readily incorporated with the alkenyl aromatic polymers to form homogeneous self-extinguishing products than is the mixture of the finely divided ammonium bromide and the stabilizing agent alone.

The finely divided ammonium bromide composition may contain, based on 100 parts by weight of the ammonium bromide, from 0.5 to 5 percent by weight of the anti-corrosion or stabilizing agent and from 0 to 80 percent of the emulsion prepared and finely divided alkenyl aromatic polymer, preferably an alkenyl aromatic polymer of low molecular weight, e.g. having a viscosity characteristic of from 1 to 10 centipoises as determined for a 10 weight percent solution of the polymer in toluene at 25° C.

The finely divided ammonium bromide compositions, particularly the spray dried compositions comprising the ammonium bromide and the anti-corrosion or stabilizing agents therefor are especially useful for making flameproof alkenyl aromatic polymers and in the making of cellular articles from such polymers which cellular articles are self-extinguishing.

The ammonium bromide compositions are incorporated with the alkenyl aromatic polymers, e.g. polystyrene, in proportions such as to form a final product containing the finely divided ammonium bromide uniformly dispersed therein in an amount less than is required for the ammonium bromide alone to render the polymer self-extinguishing, and together with the organic peroxide to form the polymer compositions of the invention. The proportion of the self-extinguishing composition to be employed will vary depending upon the organic polymer with which it is incorporated since the burning characteristics of the alkenyl aromatic polymers vary among themselves. For example, in the case of polystyrene, two percent by weight or less of the finely divided ammonium bromide in combination with an organic peroxide, e.g. dicumyl peroxide, in amounts of from 0.1 to 2 percent, based on the weight of the polystyrene, is sufficient to produce a self-extinguishing polymer composition, whereas three percent by weight or more of the ammonium bromide alone are required to make a flameproof polystyrene. When the alkenyl aromatic polymer to be rendered self-extinguishing is a blend of polystyrene and a small amount, e.g. from 1 to 10 percent by weight, of rubber or a copolymer of styrene and rubber, somewhat larger proportions of the self-extinguishing composition comprising the ammonium bromide and the organic peroxide are required.

The composition comprising the finely divided ammonium bromide and the organic peroxide can be incorporated with the alkenyl aromatic resin at temperatures between about 140° and 180° C. when the ingredients are compounded or milled together at heat-plastifying temperatures for the alkenyl aromatic resin, but is preferably incorporated with the resin or a mobile gel thereof at temperatures not higher than 160° C.

In general an amount of the self-extinguishing composition comprising the finely divided ammonium bromide and the organic peroxide, together with the stabilizing agent or anti-corrosion agent for the ammonium bromide, in an amount less than is required of the ammonium bromide alone, and within the range of from 1 to 5 percent of the ammonium bromide, from 0.1 to 1 percent of the anti-corrosion agent and from 0.05 to 2.5 percent of the organic peroxide, based on 100 parts by weight of the polymer to be rendered self-extinguishing, is satisfactory.

The ammonium bromide compositions are particularly adapted for making self-extinguishing cellular articles or foamed bodies from the alkenyl aromatic polymers. The cellular articles can be formed by known methods. A suitable method is described in U.S. Patent No. 2,669,751. In such method a thermoplastic polymer, e.g. polystyrene, in admixture with the self-extinguishing composition, or separate streams of the polymer and the self-extinguishing composition, are fed to a plastics extruder wherein the polymer is heat-softened and blended with the self-extinguishing composition and with a volatile organic compound as foaming agent to form a mobile gel of the ingredients under pressure, which is cooled and brought to a uniform temperature below the critical temperature of the volatile organic agent but above its boiling point and the mobile gel is extruded through an orifice into a zone of lower pressure wherein the extruded material expands with resultant formation of a cellular article.

In an alternate procedure self-extinguishing cellular articles can be prepared by coating the surfaces of foamable granules of a thermoplastic alkenyl aromatic polymer such as solid particles of polystyrene prepared by polymerizing monomeric styrene in an aqueous dispersion in admixture with a volatile organic substance such as pentane, hexane or petroleum ether under pressure until solid granules are obtained, then cooling the dispersion and separating the polymer granules containing the volatile substance uniformly dispersed throughout. The foamable granules are coated with a desired amount of the flame-proofing composition and a mass of the coated granules is expanded in a porous mold by heating said mass of granules in the mold to a temperature above the softening point of the polymer and above the boiling point of the volatile organic substance, then cooling the mold.

Alternatively, molding granules of the alkenyl aromatic polymer, e.g. polystyrene, can be coated or blended with the self-extinguishing compositions comprising the finely divided ammonium bromide and the organic peroxide, such blending of the ingredients being preferably carried out in the presence of a small amount of an organic liquid such as petroleum ether, butyl stearate, dibutyl phthalate or the like to cause the self-extinguishing composition to adhere to the polymer granules, and the polymer granules molded in usual ways such as by compression or extrusion methods to form molded articles which contain the ammonium bromide and the organic peroxide uniformly dispersed throughout and are self-extinguishing.

The following examples illustrate ways in which the principle of the invention has been applied, but are not to be construed as limiting its scope.

*Example 1*

(A) A charge of 16,800 parts by weight of an aqueous solution containing 37.5 percent by weight of ammonium bromide was mixed with 1325 parts by weight of an aqueous emulsion consisting of 96.25 percent by weight of water containing 3.75 percent of Tween 20 (polyoxyalkylene derivative of sorbitan monolaurate) as emulsifying agent and 79.5 parts by weight of the diethylamine salts of a 50–50 weight percent mixture of the mono- and di-octylphenyl esters of phosphoric acid, as stabilizing or anti-corrosion agent for the ammonium bromide. The solution and the aqueous emulsion were blended together to form a homogeneous dispersion. This dispersion was mixed with 5420 parts by weight of polystyrene latex containing 50 percent by weight of polystyrene, prepared by polymerizing monomeric styrene in aqueous emulsion, and containing 10 percent by weight, based on the weight of the polystyrene, of di-(sec-butyl)phenyl mono-ether of polyethylene glycol, having an average molecular weight of 2000, as stabilizer for the polystyrene latex. The composite mixture or dispersion was spray dried. The spray dried solids were collected as a finely divided free-flowing particulate material of sizes of 200 mesh per inch and smaller as determined by U.S. standard screens.

The finely divided ammonium bromide composition contained 67 percent by weight of the ammonium bromide.

(B) A charge of 200 grams of granular molding grade polystyrene was mixed with a solution consisting of 2 grams of dicumyl peroxide dissolved in 2 grams of petroleum ether (B.P. 140–210° C.) and was blended with 5.8 grams of the finely divided ammonium bromide composition prepared in part A. The resulting mixture was milled on compounding rolls at a temperature of 160° C. for a period of 10 minutes, then was removed and cooled. Test pieces of the composition in the form of a rod of ⅜ inch diameter was self-extinguishing in 1 second, when ignited in a flame and the flame removed.

In contrast, a similar composition prepared from the polystyrene and the finely divided ammonium bromide, but without the dicumyl peroxide, when tested by the same procedure was found to burn.

Example 2

A granular polystyrene having a viscosity characteristic of 20 centipoises as determined for a 10 weight percent solution of the polystyrene in toluene at 25° C. was dry blended with 2 percent by weight of spray dried ammonium bromide containing 1 percent by weight of the diethylamine salt of a 50–50 weight percent mixture of the mono- and di-octylphenyl esters of phosphoric acid as stabilizer, 1.4 percent of powdered polystyrene having a viscosity characteristic of 2 centipoises, 0.2 percent of a mixture of 4 parts by weight of finely divided titanium dioxide and 1 part by weight of zinc stearate, and 0.2 percent by weight of dicumyl peroxide. The resulting mixture was fed at a rate of 22 pounds per hour to a 2½ inch diameter barrel plastics extruder wherein it was heat-plastified, mechanically blended and extruded at a temperature of about 180° C. as a plurality of strands which were cooled and cut to a granular form. Portions of the granules were compression molded at 160° C. to form test pieces of ½ x ⅛ inch cross-section by 6 inches long. These test pieces were used to determine a burning or self-extinguishing characteristic for the composition employing procedure similar to that described in ASTM D635–56T. The composition was self-extinguishing. Flash moldings prepared to form thin films of the composition showed uniform dispersion of the ammonium bromide throughout the polymer, and such moldings had good light stability as determined in a Standard Fadeometer.

Example 3

A charge of 96.7 pounds of granular polystyrene having a viscosity characteristic of 9 centipoises, was dry blended with 0.2 pound of a mixture consisting of 4 parts by weight of finely divided titanium dioxide and 1 part by weight of zinc stearate, 0.2 pound of dicumyl peroxide and 2.9 pounds of a mixture of spray dried ammonium bromide and polystyrene latex similar to that prepared in part A of Example 1, to produce 100 pounds of material. The blended materials comprising the granular polystyrene, the ammonium bromide and the dicumyl peroxide was fed to a plastics extruder at a rate of 30 pounds per hour, wherein it was heat-plastified and mixed with 10 percent by weight of methyl chloride, fed to the extruder under pressure and was intimately blended into a homogeneous mobile gel and was extruded at temperatures between 98°–100° C. into the atmosphere wherein it foamed to produce a cellular product composed of uniform fine cells of approximately 0.2 millimeter diameter and having a density of 2.5 pounds per cubic foot. Test pieces, free of outer or continuous surface, of ¼ x 1 inch cross-section by 6 inches long were cut from the foamed product. These test pieces were used to determine a burning or self-extinguishing characteristic for the foam. The procedure for carrying out the test was to hold a test piece of the foam in a fixed horizontal position with the 1 inch width vertical, then move a micro-burner with a one inch flame under the free end of the test piece of foam so that the tip of the flame contacts the lower ¼ inch wide edge of the test piece and ignites the same. The flame is then removed and the test piece is observed for burning. The foam was self-extinguishing in 2 seconds.

Example 4

Polystyrene having a viscosity characteristic of 9 centipoises and in the form of granules was fed to a plastics extruder at a rate of 200 pounds per hour. Simultaneously with feed of the polystyrene to the extruder, there was fed a concentrate containing 30 percent by weight of spray dried ammonium bromide, prepared by procedure similar to that described in part A of Example 1, and 70 percent of emulsion polymerized polystyrene having a viscosity of 9 centipoises. The concentrate was fed to the extruder at a rate such as to form a product containing approximately 2 percent by weight of the ammonium bromide. The materials were heat-plastified and mechanically blended with one another at temperatures between about 160° and 200° C. in the extruder and were mixed with 8 percent by weight of methyl chloride, also fed to the extruder under pressure. The resulting mixture was blended and forwarded to a mixer-cooler wherein it was mixed with 0.2 percent by weight of dicumyl peroxide based on the weight of the polystyrene and fed to the mixer-cooler as a solution of the peroxide in methyl chloride. The resulting mixture was blended into a homogeneous mobile gel and brought to a temperature of 108° C., then was extruded into the atmosphere. The extruded material foamed to a cellular body composed of uniform fine cells of sizes between 0.2 and 0.3 millimeter in diameter, and having a density of 2.18 pounds per cubic foot of the foam. The cellular product contained 1.93 percent by weight of ammonium bromide, by analysis. The foam was self-extinguishing in 1.5 seconds as determined by procedure similar to that described in Example 2.

In contrast, a foam prepared by similar procedure, but without addition of the dicumyl peroxide, and containing 2.5 percent of the ammonium bromide, was found to burn when tested by the same procedure.

We claim:

1. A self-extinguishing composition of matter comprising a flammable thermoplastic alkenyl aromatic polymer of the group consisting of (a) homopolymers and copolymers of monovinyl aromatic compounds containing in chemically combined form at least 70 percent by weight of at least one monovinyl aromatic compound having the general formula:

Ar—CH=CH$_2$ wherein Ar is an aromatic radical of the group consisting of aromatic hydrocarbon and nuclear halogenated aromatic hydrocarbon radicals of the benzene series wherein the vinyl group is directly attached to a carbon atom of the aromatic nucleus and not more than 30 percent of a monomer of the group consisting of acrylonitrile, methyl methacrylate and alpha-methyl styrene, and (b) polymeric compositions consisting of from 90 to 99 percent by weight of at least one such polymerized monovinyl aromatic compound and from 10 to 1 per cent of a rubber selected from the group consisting of natural rubber, rubbery copolymers of butadiene and styrene, rubbery copolymers of butadiene and acrylonitrile and rubbery copolymers of butadiene, methylisopropenylkentone and styrene, said alkenyl aromatic polymer having intimately incorporated therewith as a self-extinguishing agent an amount of finely divided ammonium bromide in the form of particles of sizes smaller than 200 mesh per inch as determined by U.S. standard screens, within the range of from 1 to 5 percent by weight of the polymer and less than is required to render the polymer flameproof alone, and intimately associated with said ammonium bromide from 0.1 to 1 percent by weight based on the weight of the polymer, of an anti-corrosion agent selected from the group consisting of tris(nonylphenyl) phosphate, diethylamine salts of a 50–50 weight percent mixture of the mono- and di-(octylphenyl) esters of phosphoric acid, and inner salts of N-alkyl beta-aminobutyric acid having 12 to 16 carbon atoms in the alkyl radical, and from 0.05 to 2.5 percent by weight, based on the weight of the polymer, of a di(aralkyl)peroxide having the general formula:

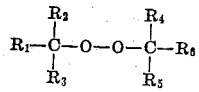

wherein $R_1$ and $R_6$ is an aromatic hydrocarbon radical of the benzene series and $R_2$, $R_3$, $R_4$ and $R_5$ are selected from the group consisting of alkyl radicals containing from 1 to 3 carbon atoms and aromatic hydrocarbon radicals of the benzene series.

2. A composition as claimed in claim 1, wherein the di(aralkyl)peroxide is dicumyl peroxide.

3. A composition as claimed in claim 1, wherein the alkenyl aromatic polymer is polystyrene.

4. A composition as claimed in claim 1, wherein the alkenyl aromatic polymer is polystyrene in cellular form, the di(aralkyl)peroxide is dicumyl peroxide and the anti-corrosion agent is the diethylamine salts of a 50-50 weight percent mixture of the mono- and di-(octylphenyl) esters of phosphoric acid.

5. A method of making a self-extinguishing composition of matter which comprises (1) intimately incorporating with a flammable thermoplastic alkenyl aromatic polymer of the group consisting of (a) homopolymers and copolymers of monovinyl aromatic compounds containing in chemically combined form at least 70 percent by weight of at least one monovinyl aromatic compound having the general formula:

$$Ar\!-\!CH\!=\!CH_2$$

wherein Ar is an aromatic radical of the group consisting of aromatic hydrocarbon and nuclear halogenated aromatic hydrocarbon radicals of the benzene series wherein the vinyl group is directly attached to a carbon atom of the aromatic nucleus, and not more than 30 percent by weight of a monomer of the group consisting of acrylonitrile, methyl methacrylate and alphamethyl styrene, and (b) polymeric compositions consisting of from 90 to 99 percent by weight of at least one such polymerized monovinyl aromatic compound and from 10 to 1 percent of a rubber selected from the group consisting of natural rubber, rubbery copolymers of butadiene and styrene, rubbery copolymers of butadiene and acrylonitrile and rubbery copolymers of butadiene, methyl isopropenyl ketone and styrene, (2) finely divided ammonium bromide in the form of particles of sizes smaller than 200 mesh per inch as determined by U.S. standard screens, within the range of from 1 to 5 percent by weight of the polymer and in an amount less than is required to render the polymer flame-proof alone, (3) intimately associated with said ammonium bromide from 0.1 to 1 percent, based on the weight of the polymer of an anticorrosion agent selected from the group consisting of tris(nonylphenyl)phosphate, the diethylamine salts of a 50-50 weight percent mixture of the mono- and di-(octylphenyl) esters of phosphoric acid, and the inner salts of N-alkyl beta-aminobutyric acid having 12 to 16 carbon atoms in the alkyl radical, and from 0.05 to 2.5 percent based on the weight of the polymer of a di-(aralkyl) peroxide having the general formula:

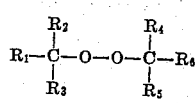

wherein $R_1$ and $R_6$ is an aromatic hydrocarbon radical of the benzene series and $R_2$, $R_3$, $R_4$ and $R_5$ is selected from the group consisting of alkyl radicals containing from 1 to 3 carbon atoms and aromatic hydrocarbon radicals of the benzene series, said di-(aralkyl)peroxide being incorporated with said alkenyl aromatic polymer by blending said ingredients into a homogeneous composition at heat-softening temperatures not higher than 180° C. for a period of time not exceeding 10 minutes.

6. A method as claimed in claim 5, wherein the di-(aralkyl) peroxide is dicumyl peroxide.

7. A method as claimed in claim 5, wherein the alkenyl aromatic polymer is polystyrene.

8. A method as claimed in claim 5, wherein the alkenyl aromatic polymer is mixed with a volatile organic substance under pressure to form a mobile gel and the di(aralkyl)peroxide is incorporated with said gel at temperatures below 180° C. and the gel is thereafter extruded into a zone of lower pressure and expanded to form a cellular article.

9. A method as claimed in claim 8, wherein the alkenyl aromatic polymer is polystyrene, the di(aralkyl)peroxide is dicumyl peroxide and the anti-corrosion agent is the diethylamine salts of a 50-50 weight percent mixture of the mono- and di-(octylphenyl)esters of phosphoric acid.

10. A self-extinguishing composition of matter comprising a flammable thermoplastic alkenyl aromatic polymer of the group consisting of (a) homopolymers and copolymers of monovinyl aromatic compounds containing in chemically combined form at least 70 percent by weight of at least one monovinyl aromatic compound having the general formula:

$$Ar\!-\!CH\!=\!CH_2$$

wherein Ar is an aromatic radical of the group consisting of aromatic hydrocarbon and nuclear halogenated aromatic hydrocarbon radicals of the benzene series wherein the vinyl group is directly attached to a carbon atom of the aromatic nucleus and not more than 30 percent of a monomer of the group consisting of acrylonitrile, methyl methacrylate and alpha-methyl styrene, and (b) polymeric compositions consisting of from 90 to 99 percent by weight of at least one such polymerized monovinyl aromatic compound and from 10 to 1 percent of a rubber selected from the group consisting of natural rubber, rubbery copolymers of butadiene and styrene, rubbery copolymers of butadiene and acrylonitrile and rubbery copolymers of butadiene, methyl-isopropenylketone and styrene, said alkenyl aromatic polymer having intimately incorporated therewith as a self-extinguishing agent an amount of finely divided ammonium bromide in the form of particles of sizes smaller than 200 mesh per inch as determined by U.S. standard screens, within the range of from 1 to 5 percent by weight of the polymer and less than is required to render the polymer flame-proof alone, and intimately associated with said ammonium bromide from 0.1 to 1 percent by weight based on the weight of the polymer, of an anti-corrosion agent selected from the group consisting of tris(nonylphenyl)phosphate, diethylamine salts of a 50-50 weight percent mixture of the mono- and di-(octylphenyl) esters of phosphoric acid, and inner salts of N-alkyl beta-aminobutyric acid having from 12 to 16 carbon atoms in the alkyl radical and from 0.05 to 2.5 percent by weight, based on the weight of the polymer, of an organic peroxide having a half-life of at least 2 hours as determined in benzene at 100° C.

References Cited in the file of this patent

UNITED STATES PATENTS 2,755,260   Stilbert et al. _____ July 17, 1956